United States Patent
Marc et al.

(10) Patent No.: US 11,734,796 B2
(45) Date of Patent: Aug. 22, 2023

(54) METHODS AND APPARATUS FOR SHARED IMAGE PROCESSING AMONG MULTIPLE DEVICES

(71) Applicant: GoPro, Inc., San Mateo, CA (US)

(72) Inventors: Gladys Jocelyne Marc, Paris (FR); Alexis Lefebvre, Paris (FR); Cesar Douady, Orsay (FR); Guillaume Guerin, Renens (CH)

(73) Assignee: GoPro, Inc., San Mateo, CA (US)

(*) Notice: Subject to any disclaimer, the term of this patent is extended or adjusted under 35 U.S.C. 154(b) by 162 days.

(21) Appl. No.: 17/230,135

(22) Filed: Apr. 14, 2021

(65) Prior Publication Data

US 2021/0327025 A1    Oct. 21, 2021

Related U.S. Application Data

(60) Provisional application No. 63/010,576, filed on Apr. 15, 2020.

(51) Int. Cl.
*G06T 3/40* (2006.01)
*G06T 3/00* (2006.01)
*G06T 7/30* (2017.01)

(52) U.S. Cl.
CPC .......... *G06T 3/4038* (2013.01); *G06T 3/0087* (2013.01); *G06T 7/30* (2017.01); *G06T 2207/20016* (2013.01); *G06T 2207/20132* (2013.01)

(58) Field of Classification Search
CPC ... G06T 3/0018; G06T 3/0062; G06T 3/0068; G06T 3/0078; G06T 3/0087; G06T 3/4038; G06T 7/30–38; G06T 2207/20016; G06T 2207/20132
See application file for complete search history.

(56) References Cited

U.S. PATENT DOCUMENTS

| | | | | |
|---|---|---|---|---|
| 10,484,601 | B2* | 11/2019 | Kikuta | H04N 5/2624 |
| 2011/0216179 | A1* | 9/2011 | Dialameh | G06F 16/955 |
| | | | | 348/E7.085 |
| 2018/0182143 | A1* | 6/2018 | Veldandi | G06T 3/4038 |
| 2019/0014260 | A1* | 1/2019 | Mu | G06T 3/0068 |
| 2020/0265566 | A1* | 8/2020 | Glotzbach | G06T 7/0002 |
| 2021/0160426 | A1* | 5/2021 | Aguilar | H04N 23/56 |
| 2021/0203844 | A1* | 7/2021 | Newman | H04N 23/698 |

FOREIGN PATENT DOCUMENTS

WO    WO-2008070949 A1 *  6/2008  ........... G06T 3/4038

OTHER PUBLICATIONS

Burt, Peter J., and Edward H. Adelson. "A multiresolution spline with application to image mosaics." ACM Transactions on Graphics (TOG) 2.4 (1983): 217-236. (Year: 1983).*

(Continued)

*Primary Examiner* — Ian L Lemieux
(74) *Attorney, Agent, or Firm* — Wang Hardoon, P.C.

(57) ABSTRACT

Methods and apparatus for shared image processing among multiple devices. In one embodiment, an exemplary action camera performs a partial multiband blend. Even though the action camera may not have resources to handle the multiband blend of the entire action camera's footage, it can do a significant portion. The partially blended content can be used in ready-to-share applications, or completely blended by another device.

20 Claims, 10 Drawing Sheets

(56) References Cited

OTHER PUBLICATIONS

Brown, Chip. "Bringing pixels front and center in VR video." The Keyword, Google. Mar. 14, 2017. <https://blog.google/products/google-ar-vr/bringing-pixels-front-and-center-vr-video/>. (Year: 2017).*

Corbillon, Xavier, et al. "Viewport-adaptive navigable 360-degree video delivery." 2017 IEEE international conference on communications (ICC). IEEE, 2017. (Year: 2017).*

Bajpai, Pankaj, et al. "High quality real-time panorama on mobile devices." 2018 IEEE International Conference on Multimedia & Expo Workshops (ICMEW). IEEE, 2018. (Year: 2018).*

Chun, Byung-Gon, et al. "Clonecloud: elastic execution between mobile device and cloud." Proceedings of the sixth conference on Computer systems. 2011. (Year: 2011).*

Popovic, Vladan, et al. "Real-time hardware implementation of multi-resolution image blending." 2013 IEEE International Conference on Acoustics, Speech and Signal Processing. IEEE, 2013. (Year: 2013).*

Zhao, Nan, and Xinqi Zheng. "Multi-band blending of aerial images using GPU acceleration." 2017 10th International Congress on Image and Signal Processing, BioMedical Engineering and Informatics (CISP-BMEI). IEEE, 2017. (Year: 2017).*

Zhu, Zhe, et al. "A comparative study of algorithms for realtime panoramic video blending." IEEE Transactions on Image Processing 27.6 (2018): 2952-2965. (Year: 2018).*

* cited by examiner

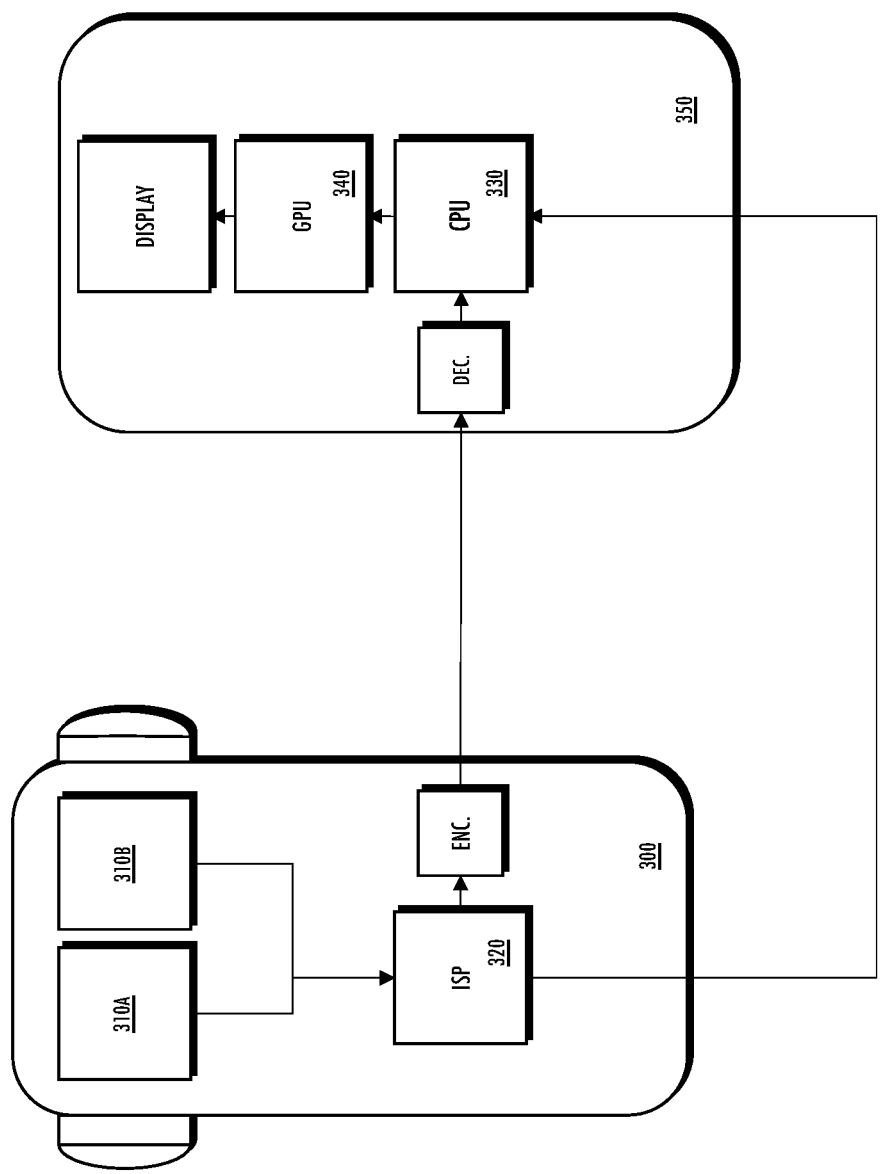

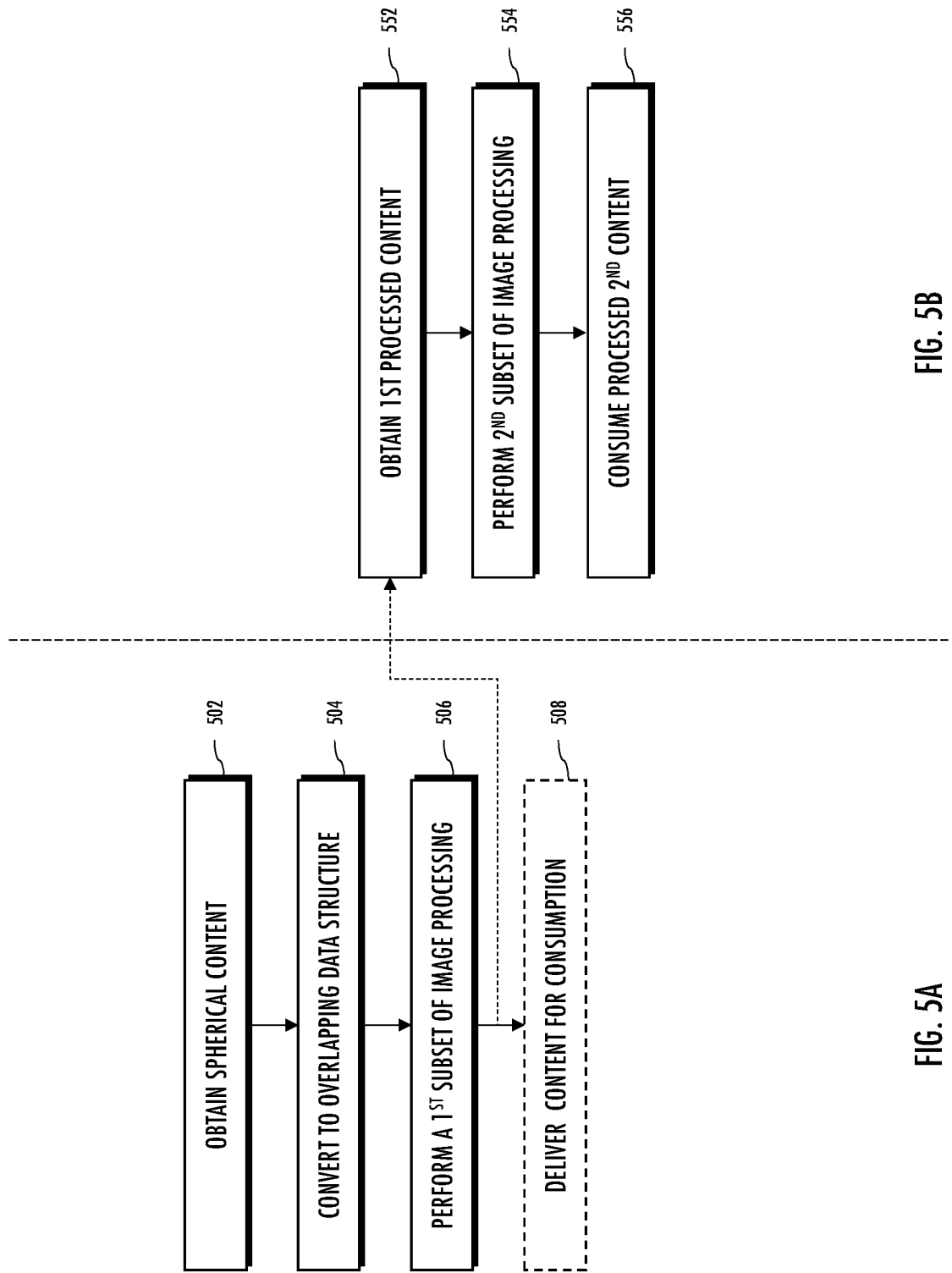

METHODS AND APPARATUS FOR SHARED IMAGE PROCESSING AMONG MULTIPLE DEVICES

PRIORITY

This application claims the benefit of priority to co-owned U.S. Patent Application Ser. No. 63/010,576 entitled "METHODS AND APPARATUS FOR SHARED IMAGE PROCESSING AMONG MULTIPLE DEVICES", filed Apr. 15, 2020, the contents of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to image processing. Specifically, the present disclosure relates in some exemplary aspects to image processing of spherical content, such as within image processing ecosystems.

DESCRIPTION OF RELATED TECHNOLOGY

Sophisticated image processing techniques can be used to achieve a number of different visual effects. As but one such example, "multiband blending" is a commonly used technique for combining images. Advantageously, multiband blending preserves high frequency image information (e.g., edges are not washed out), while still ensuring that low frequency image information is smoothly blended.

Unfortunately, due to the high memory and computational complexity requirements, sophisticated image processing has historically been relegated to resource intensive environments, e.g., post-processing workstations and/or specialized hardware acceleration. Existing solutions are not desirable for embedded device manufacturers (such as the GoPro HERO™ families of devices) or their ecosystems (e.g., smart phones, laptops, and/or other mobile media playback devices).

SUMMARY

The present disclosure discloses, inter alia, methods and apparatus for shared image processing among multiple devices.

In one aspect, methods and apparatus configured to enable shared image processing among multiple devices are disclosed. One exemplary method includes: obtaining spherical content; converting the spherical content to an overlapping data structure; performing a first subset of the shared image processing on the overlapping data structure; and consuming a first image processed data structure. In a related embodiment, an apparatus configured to perform the foregoing techniques is described. In one exemplary embodiment, the apparatus may include a processor, and a non-transitory computer-readable medium comprising one or more instructions which when executed, cause the apparatus to: obtain spherical content; convert the spherical content to an overlapping data structure; perform a first subset of the shared image processing on the overlapping data structure; and consume a first image processed data structure.

In a further aspect, methods and apparatus configured to enable shared image processing among multiple devices are disclosed. One exemplary method includes: obtaining a first image processed data structure associated with a first subset of an image processing set, where the image processing set corresponds to an image quality criteria; performing a second subset of the shared image processing set on the first image processed data structure; and consuming a second image processed data structure corresponding to the image quality criteria. In a related embodiment, an apparatus configured to perform the foregoing techniques is described. In one exemplary embodiment, the apparatus may include a processor, and a non-transitory computer-readable medium comprising one or more instructions which when executed, cause the apparatus to: obtain a first image processed data structure associated with a first subset of an image processing set, where the image processing set corresponds to an image quality criteria; perform a second subset of the shared image processing set on the first image processed data structure; and consume a second image processed data structure corresponding to the image quality criteria In a further aspect, methods and apparatus configured to enable shared image processing among multiple devices are disclosed. One exemplary apparatus includes: a first camera and a second camera; a processor; and a non-transitory computer-readable medium. In one specific implementation, the instructions, when executed by the processor causes the apparatus to: capture spherical content by the first camera and the second camera, the spherical content comprising overlapping regions captured by the first camera and the second camera; align the spherical content to create an overlapping data structure; perform a partial multiband blend on the overlapping data structure to create a partially processed overlapping data structure with low frequency metadata; and transmit the partially processed overlapping data structure with the low frequency metadata to a second device. In a related embodiment, a method for performing the foregoing techniques is described. In one exemplary embodiment, the method may include: capturing spherical content by the first camera and the second camera, the spherical content comprising overlapping regions captured by the first camera and the second camera; aligning the spherical content to create an overlapping data structure; performing a partial multiband blend on the overlapping data structure to create a partially processed overlapping data structure with low frequency metadata; and transmitting the partially processed overlapping data structure with the low frequency metadata to a second device.

In another related aspect, methods, systems, and apparatus for shared image processing among multiple devices are disclosed.

In a further aspect, methods, systems, and apparatus for "pyramid" image data processing are disclosed.

In a further aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a non-transitory computer readable storage apparatus implementing one or more of the foregoing aspects is disclosed and described. In one embodiment, the computer readable apparatus includes a program memory, or an EEPROM. In another embodiment, the apparatus includes a solid-state drive (SSD) or other mass storage device. In another embodiment, the apparatus includes a USB or other "flash drive" or other such portable removable storage device.

In yet a further aspect, a system is disclosed. In one embodiment, the system includes one or more camera apparatus configured on accordance with one or more of the foregoing aspects.

Other aspects, features and advantages of the present disclosure will immediately be recognized by persons of ordinary skill in the art with reference to the attached drawings and detailed description of exemplary embodiments as given below.

BRIEF DESCRIPTION OF THE DRAWINGS

FIGS. 3A-3C are logical block diagrams illustrating an exemplary image processing ecosystem, useful for explaining various embodiments of the present disclosure.

FIGS. 5A-5B are logical block diagrams of exemplary methods for shared image processing among multiple devices, consistent with various principles of the present disclosure.

DETAILED DESCRIPTION

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Multiband Image Blending

As a brief aside, there are many different image processing techniques that may be used to blend images; one commonly used technique is so-called "multiband blending."

Figure 1A:
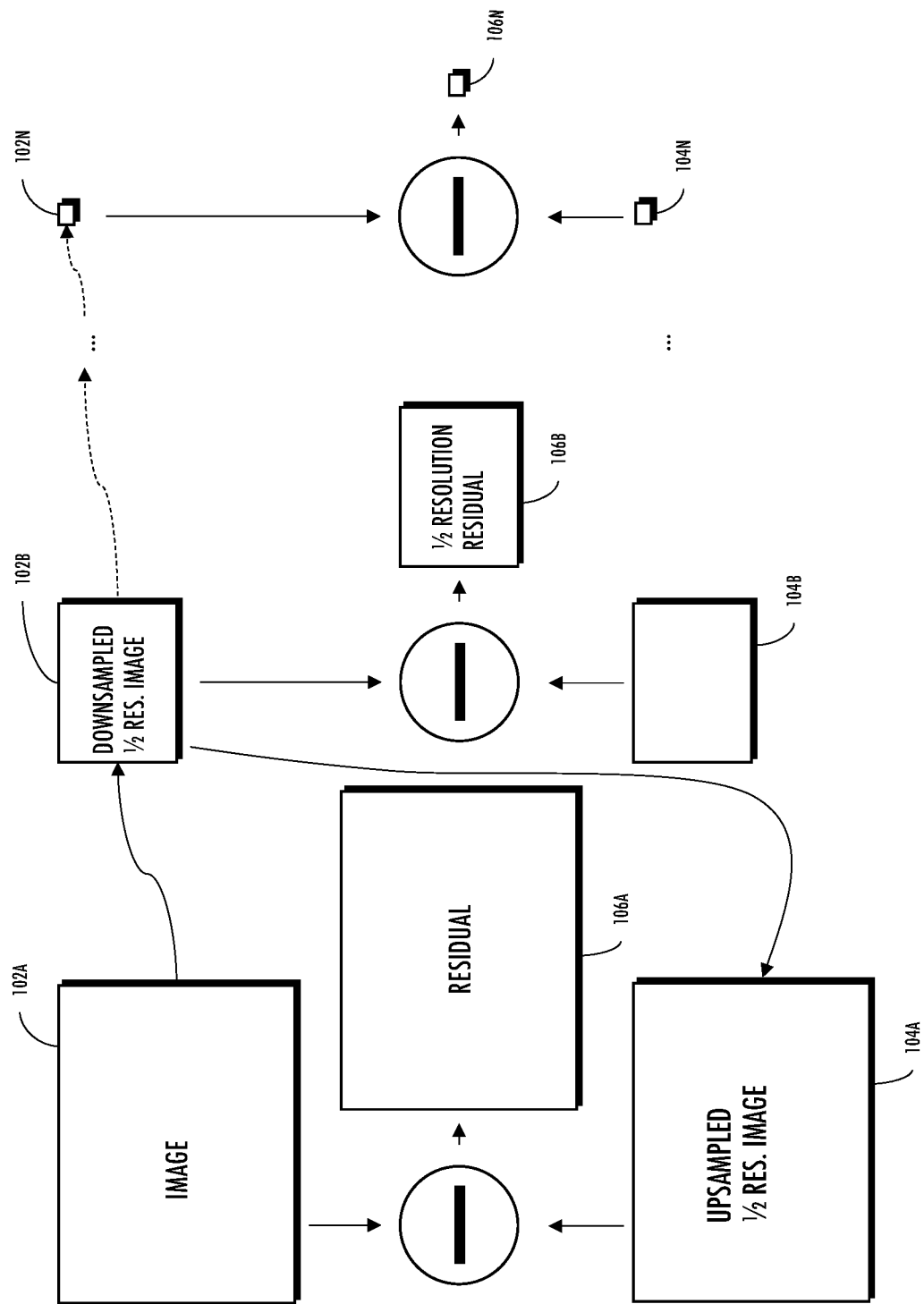
FIGS. 1A-1B are graphical representations of multiband image processing, useful for explaining multiband blending.

FIG. 1A is a graphical representation of "pyramid" image processing useful in explaining multiband blending. As shown in FIG. 1A, an image can be separated into its constituent frequency components via an iterative process of blurring and subtraction. This is analogous to a two-dimensional wavelet transform (a decomposition of a signal into a set of contractions, expansions, and translations of a basis wavelet) For example, an image 102A may be downsampled to a half-resolution image 102B. The half-resolution image 102B is then upsampled to create an upsampled ¼ resolution image 104A. The residual image 106A is created by subtracting the upsampled image 104A from the original image 102A. This process is iteratively repeated to the extent required (each iteration requires more processing resources but preserves fidelity across a broader frequency range). This may include generating upsampled ¼ resolution image 104B (through upsampled image 104N) from the quarter-resolution image (through downsampled counterpart 102N) to create the ¼ resolution residual image 106B (through residual image 106N). Notably, the residual "pyramid" of images 106A through 106N contains all of the difference information necessary to recreate the original image 102A from the downsampled counterpart 102N (which may be a single pixel for images having evenly divisible dimensions).

Figure 1B:
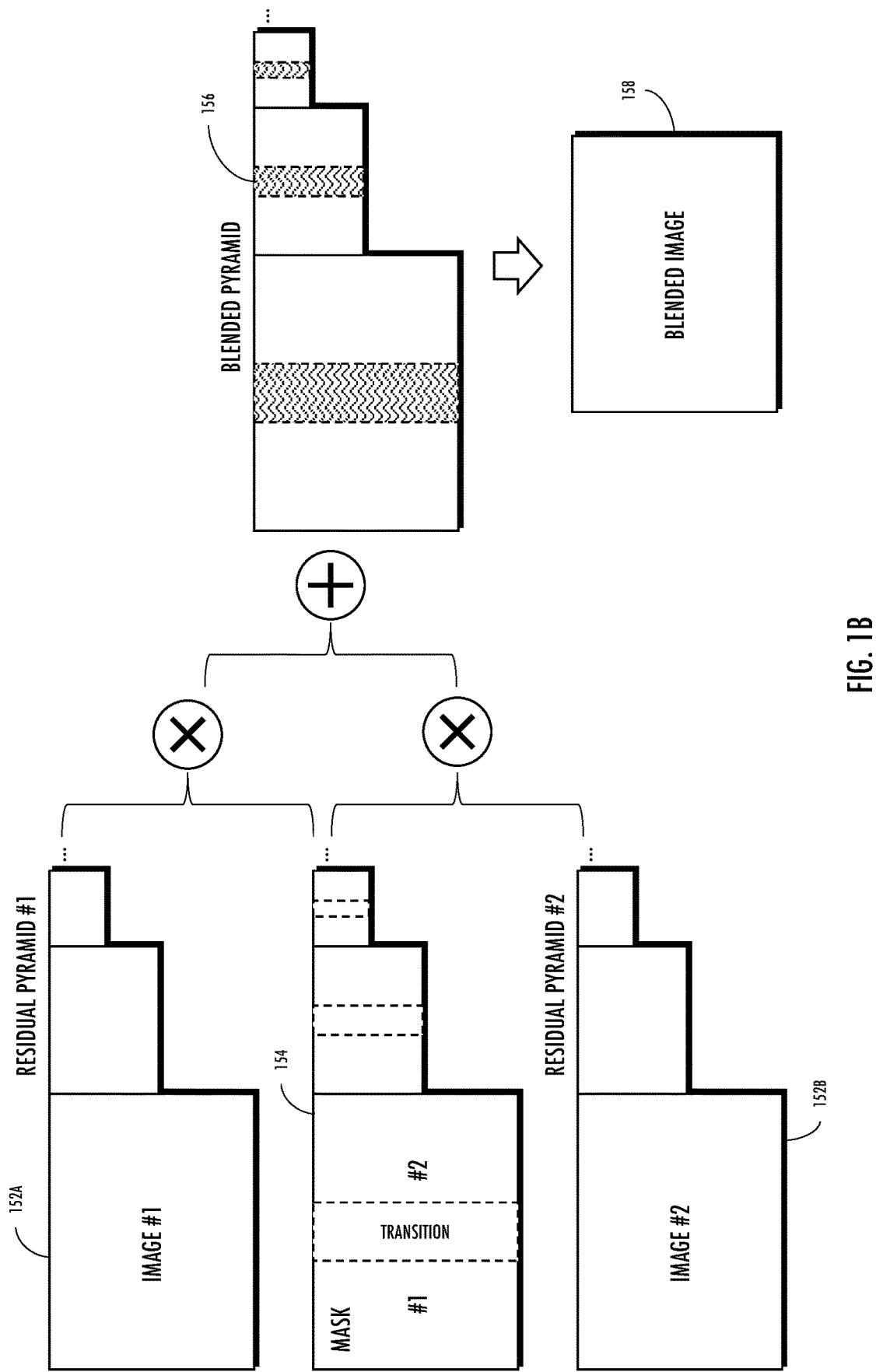

Referring now to FIG. 1B, one representation of multiband blending based on pyramid image representations is shown. As shown therein, multiband blending can be performed with two images by building residual pyramid image representations 152A, 152B of the two images. A "mask" pyramid 154 is constructed. The mask 154 defines a blend weight between the first and the second image pyramids for each pyramid level. For each pyramid level, the levels of the two pyramids 152A, 152B are combined based on the weights of the mask pyramid 154 and summed together to create a blended pyramid 156. Collapsing together all the level-wise summations, generates a resulting output blended image 158.

Many variants of multiband blending exist for a variety of different applications and/or constraints. For example, some implementations may only use a subset of the image pyramid tiers (or scales), so as to reduce processing and/or memory burden (resulting in some image information loss). Similarly, some implementations may use different masking weights; for example, linear weights and gaussian weights. Yet other variants may adjust how upsampling and/or downsampling are performed; for example, "non-power-of-two" images cannot be evenly halved (downsampled); a variety of techniques exist to handle the remainders.

Multiband Blending for Spherical Image Processing Applications

Historically, the aforementioned multiband blending operation was used to patch together two images of different spectral densities (for example, photoshopping a picture of a person into a landscape picture). More recently however, multiband blending has been adapted to panoramic applications. For example, action camera systems use multiple cameras to capture panoramic content (view angles greater than 120°; in some cases, up to a full 360° view). Multiband blending can be used to resolve differences between camera captures.

Figure 2A:
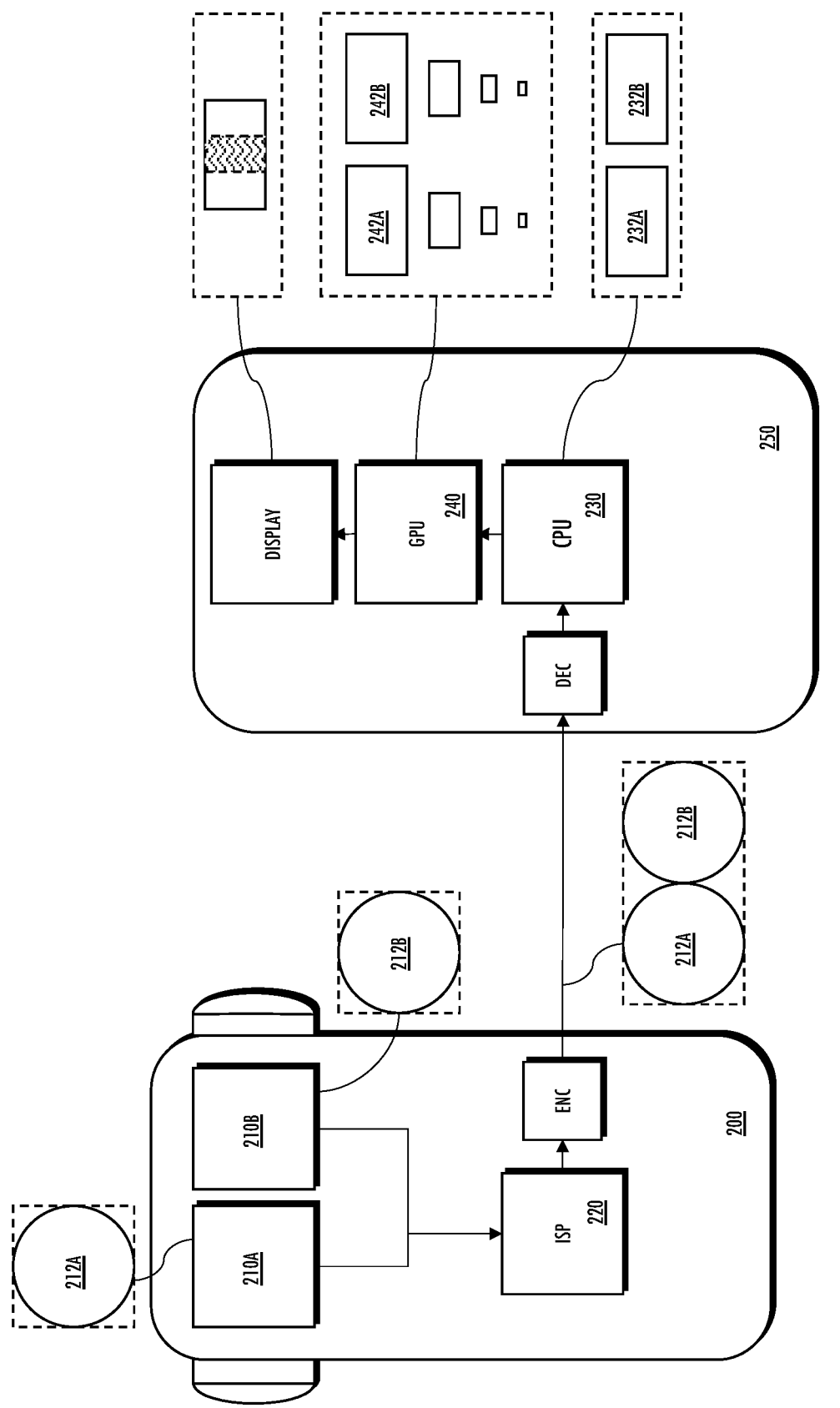
FIGS. 2A-2B are graphical representations of an image processing ecosystem and corresponding multiband blending, useful for explaining various embodiments of the present disclosure.

FIG. 2A illustrates a traditional approach for using two fisheye lenses in a back-to-back configuration to generate a 360° panoramic image, common in so-called "action cameras." As shown, the camera system 200 includes a "front-facing" camera 210A and a "back-facing" camera 210B facing in an opposite direction of the front-facing camera 210A. While the designations of front-facing and back-facing are useful in describing the example processes described herein, these designations are arbitrary and the camera system 200 may operate in any absolute or relative orientation.

The front camera 210A captures a first fisheye image 212A and the back camera 210B captures a second fisheye image 212B. The fisheye images 212A, 212B may each include a hyper-hemispherical FOV that captures slightly greater than a 180° range in at least one direction. Because the respective fisheye images 212A, 212B are hyper-hemispherical (e.g., greater than 180°), they overlap near their respective boundaries. For example, the fisheye images 212A, 212B may overlap by n degrees (e.g., where n equals 1°, 5°, 10° or other various degrees of field of view overlap between the front-facing and back-facing camera). These overlapping regions may be used for the stitching and blending of separately captured images obtained by the respective cameras.

As a brief aside, action cameras and other 360° applications have unique use considerations that are different than e.g., traditional photography. For example, the action camera may operate under a broad range of lighting conditions: one camera may be well lit, whereas the other is poorly lit. The differences in exposure between the cameras may result in unique image processing complications. Specifically, the different lighting conditions for each camera sensor result in different exposure times and shutter speeds which affect color, white balance, and contrast in unpredictable ways. These differences in shooting conditions can create a visible "exposure transition" in the resulting fisheye images. More generally, multi-camera photography may experience a wide variety of differences in captured images that are caused by the camera mechanisms, rather than the subject being photographed. Common examples of such image artifacts include without limitation: lens flares, disparate shading, color banding (and other digitization errors), etc.

Figure 2B:
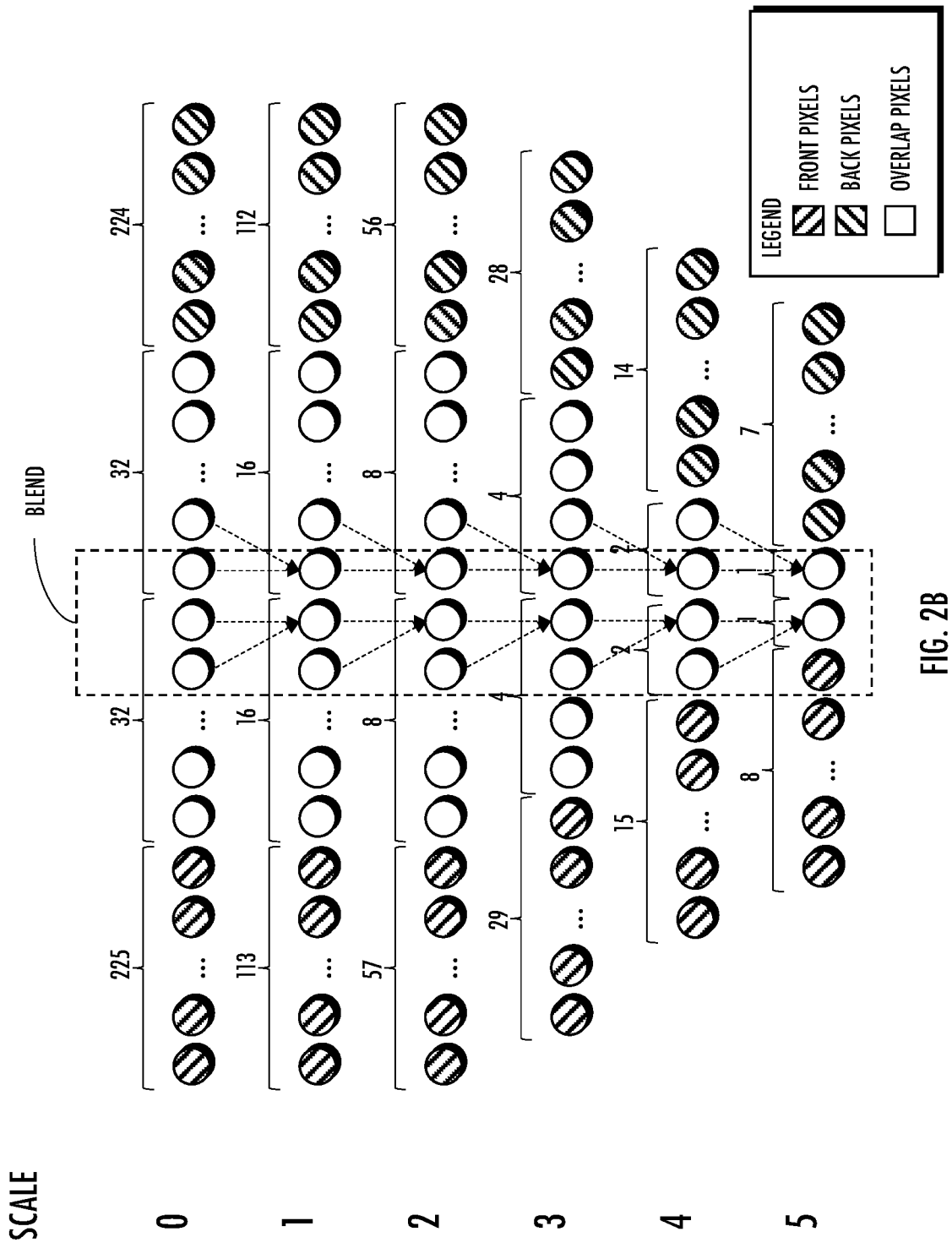

Ideally, the exposure transition can be blended using a spherical variant of the aforementioned multiband blending techniques. FIG. 2B is a graphical representation of pixel dependency for spherical multiband blending (only scales 0-5 are shown). At each iteration, the pixels are downscaled, and a subset of the downsampled pixels are blended. For example, at scale 1 there are: 113 front pixels, 32 overlap pixels, and 112 back pixels, etc. In the illustrated implementation, only the middle three (3) columns are blended together. Empirically, a multiband blend over 513-pixels (corresponding to 9 iterations of a multiband blend) is needed to imperceptibly smooth over exposure transition artifacts. Notably, the blend is only performed with known and overlap pixels up to the 5th iteration (scale 4); the 6th-9th iteration (scales 5-8) would require information from pixels that are "unknown" to at least one camera (i.e., solely present in the other camera's image).

Multiband blending is a computationally intensive task that has been historically handled in post-processing. Referring back to FIG. 2A, the fisheye images 212A, 212B are transmitted off-camera to a workstation or similarly capable device 250. The workstation 250 may include a dedicated graphic processing unit (GPU) 240. The workstation CPU 230 converts the fisheye images 212A, 212B to rectangular image formats 232A, 232B. The rectangular image formats 232A, 232B can then be DMA'd (direct memory access) by a GPU (242A, 242B) for high performance graphics processing. The resulting blended image can be displayed and/or stored for subsequent use.

Notably, GPUs 240 have a number of characteristics that are functionally different from both image signal processors (ISPs) 220 and general-purpose central processing units (CPUs) 230. As but one example, GPUs are constructed in a highly parallel structure for processing large blocks of image data with specialized logic (e.g., dedicated matrix multiplication logic, deep pipelines, etc.). In contrast, ISPs 220 are typically optimized for mobile use (e.g., low power operation and camera-specific management). Similarly, CPUs 230 are generalized to handle a much wider variety of processing (e.g., frequent branching and/or conditional operations accessing many different types of data structures).

A relatively recent phenomenon in consumer usage has changed the way that action cameras are expected to interact with other devices. Many users want to review captured video via their smart phones to determine whether or not they successfully captured the intended footage (and re-shoot, if necessary). In some cases, consumers may also want to share the captured footage with their friends and family. Notably, "ready-to-view/share" use cases are limited to processing and/or memory capabilities of the user's nearby devices (e.g., the action camera and the user's smart phone, etc.).

Example Operation

A relatively recent phenomenon in consumer usage has changed the way that action cameras are expected to interact with other devices. Many users want to review captured video via their smart phones to determine whether or not they successfully captured the intended footage (and re-shoot, if necessary). In some cases, consumers may also want to share the captured footage with their friends and family. Notably, "ready-to-view/share" use cases are limited to processing and/or memory capabilities of the user's nearby devices (e.g., the action camera and the user's smart phone, etc.)

Unfortunately, existing action cameras lack sufficient Image Signal Processing (ISP) resources and "real-time" budget to do a multiband blend across the exposure transition between fisheye images. However, recent advancements to mobile device components have greatly improved processing in other devices of the mobile ecosystem. Some smart phones may have the processing and memory resources to perform multiband blending for their display size (e.g., "4K"), or possibly a portion thereof. Additionally, smart phones can prioritize tasks according to "best effort" budgets (as distinguished from "real-time" processing).

As used herein, the term "real-time" refers to tasks that must be performed within definitive time constraints; for example, an action camera has to capture each frame of video at the specific rate of capture (e.g., 30 frames per second (fps)). As used herein, the term "near real-time" refers to tasks that must be performed within definitive time constraints once started; for example, a smart phone must render each frame of video at its specific rate of display, however some queueing time may be allotted. As used herein, "best effort" refers to tasks that can be handled with variable bit rates and/or latency. As but one such example, a user that wants to view a video on their smart phone can wait for a short delay for the smart phone to queue and post-process video. Live streaming applications of arbitrary duration are ideally handled at real-time or near real-time, since best effort treatment is likely to incur performance degradation.

While some mobile devices may be able to do multiband blending, not all devices may be so enabled. Smart phones, tablets, laptops, and other consumer electronics devices span a wide gamut of capabilities. In some cases, mobile devices may emphasize other considerations (e.g., power consumption, cost, form factor, ruggedization, etc.) over processing power and memory. In other words, action camera manufacturers cannot reliably predict what capabilities other mobile devices may provide. Furthermore, the user's application may vary in quality requirements; for example, exposure transitions may be fine in quick "footage checks" since the user intends to do correction later anyway, however they should be minimized for video that is to be immediately shared. Ideally, the action camera should enable "ready-to-view/share" across the broadest range of devices and/or use cases possible.

To these ends, methods and apparatus for multiband blending of spherical content within a user's mobile ecosystem of devices are needed. In one exemplary embodiment, an action camera performs part of the multiband blending and provides the partially blended content to another mobile device. The mobile device can either complete the multiband blending or may share the content as-is, depending on usage considerations. In some cases, the original content and/or partially blended content may also be provided for subsequent review and selective use during post-processing (e.g., when the user returns home with their captured footage to perform edits at the highest possible quality). More generally, the various principles described herein broadly enable sharing image processing among multiple devices.

Notably, splitting multiband blending between an action camera and another device (e.g., a mobile device) may provide additional synergistic benefits which are distinct from the "ready-to-view/share" applications. As but one example, many commodity codecs rely on discrete cosine transforms (DCTs) to encode image information; unfortunately, image and/or color discontinuities are encoded/decoded as high frequency components. Often times, high frequency components "bloat" the compression efficiency, or conversely, introduce image artifacts when they are removed (e.g., during lossy encoding). However, partial multiband blending reduces image/coloration discontinuities and creates a smooth transition between the image textures. Even though low frequencies may remain unblended, low frequency components have a much lower impact on the encoder efficiency. In other words, partial multiband blending, prior to the codec chain (e.g., delivery from the camera to another device), greatly improves codec efficiency and may also minimize visual artifacts that are introduced by lossy encoding/decoding.

Furthermore, post-processing devices vary widely in e.g.: processing and memory resources (e.g., personal computers, laptops, smartphones, tablets, etc.), indigenous software support (e.g., generic operating system support, graphics processing engines, etc.), hardware behavior (e.g., codec support), and other system considerations. Action camera manufacturers do not control the post-processing environment; often niche applications (such as 360° panoramic applications) are one-of-many different use cases that a post-processing device may support. To these ends, partial multiband blending performs the application-specific multiband implementation in-camera (e.g., 360° stitch, etc.), thereby reducing post-processing complexity external to the camera. As a direct benefit, the post-processing environment only needs to support relatively generic imaging processing operations via metadata (e.g., highly parallel pixel operations). Reducing the post-processing environment requirements greatly facilitates support and adoption by other members of the consumer electronics ecosystem.

As a related corollary, since the action camera and post-processing environment vary in their respective capabilities, certain applications may benefit more (or less) from performing partial multiband blending in-camera. For example, real-time high-resolution videography applications may preferentially process multiband scales within the action camera, since the embedded hardware system on a chip (SOC) is designed for such applications. In contrast, high frame per second (FPS) capture and slow-motion replay applications may benefit more from processing multiband scales within smartphones (where there is more time budget, but an immediate need for display quality). A mixed approach as described in greater detail infra, may dynamically allocate partitioning so as to optimize results for the best outcome e.g., based on the action camera and the post-processing environment.

While the exemplary action camera enables "ready-to-view/share" content, various embodiments of the present disclosure may also provide either (or both of) the original unblended content and the intermediary partial multiband scales (e.g., the downscaled overlaps, etc.) via metadata files. The metadata may be used to re-do the multiband processing, in its entirety, or from some intermediary step. For example, in-camera motion estimation and stitching errors (prior to the partial multiband blending) may unintentionally introduce visual artifacts that cannot be removed in post-processing; while most of the partially blended video may be used, certain frames may require a complete redo of the multiband blend. More directly, the metadata files may be used to avoid unnecessary re-computation (e.g., the majority of the video) while still enabling focused correction of in-camera processing errors (e.g., spot touchups).

While the following discussion is presented in the context of a multi-device application (e.g., an action camera and a post-processing device), the techniques may also be broadly applied to single device systems. As but one such example, time-shifted multiband blending performs the multiband blend at multiple times. For example, an action camera (or other capture device) may capture content and perform a first step of the multiband blend in "real-time" for ready-to-share applications. However, later, when the user is at home doing video edits, the action camera can perform the second step of the multiband blend under "best effort" conditions (e.g., when ample power and bandwidth are available). As another such example, the action camera may enable faster transfers of ready-to-share quality or slower transfers of advanced format/best image quality (IQ) (the additional transfer time is used to complete the multiband blend).

Referring now to FIG. 3A, one logical block diagram of an action camera 300 in data communication with a smart phone 350, useful to illustrate various aspects of the present disclosure, is illustrated. As shown therein, the camera system 300 includes a "front-facing" camera 310A and a "back-facing" camera 310B. The action camera 300 further includes an Image Signal Processor (ISP) 320 and a codec to transfer media. In addition, the action camera may transport other data (e.g., metadata, etc.) via an external interface (e.g., USB, memory card, etc.). The smart phone 350 includes a central processing unit (CPU) 330 to handle general compute tasks. Additionally, the smart phone may include a specialized graphic processing unit (GPU) 340, codec for processing media, external interface, and/or other user interface components (a touchscreen display, etc.).

As a brief aside, multiband blending algorithms are designed to work on rectangular images since the downsampling and upsampling operations use a rectangular kernel. As a practical matter, the action camera 300 may mathematically re-project the fisheye images to rectangular images in order to perform multiband blending. In one exemplary embodiment of the present disclosure, the fisheye images are re-projected to an equi-angular cubemap (EAC). Techniques for fisheye-to-EAC conversion are discussed in greater detail within co-owned and co-pending U.S. patent application Ser. No. 16/572,383, filed Sep. 16, 2019, and entitled "METHODS AND APPARATUS FOR MAXIMIZING CODEC BANDWIDTH IN VIDEO APPLICATIONS", and co-owned and co-pending U.S. patent application Ser. No. 16/730,839, filed Dec. 30, 2019, and entitled "METHODS AND APPARATUS FOR MAXIMIZING CODEC BANDWIDTH IN VIDEO APPLICATIONS", each of which are incorporated herein by reference in its entirety, although it will be recognized that these techniques are exemplary, and others may be substituted with equal success.

Figure 3B:
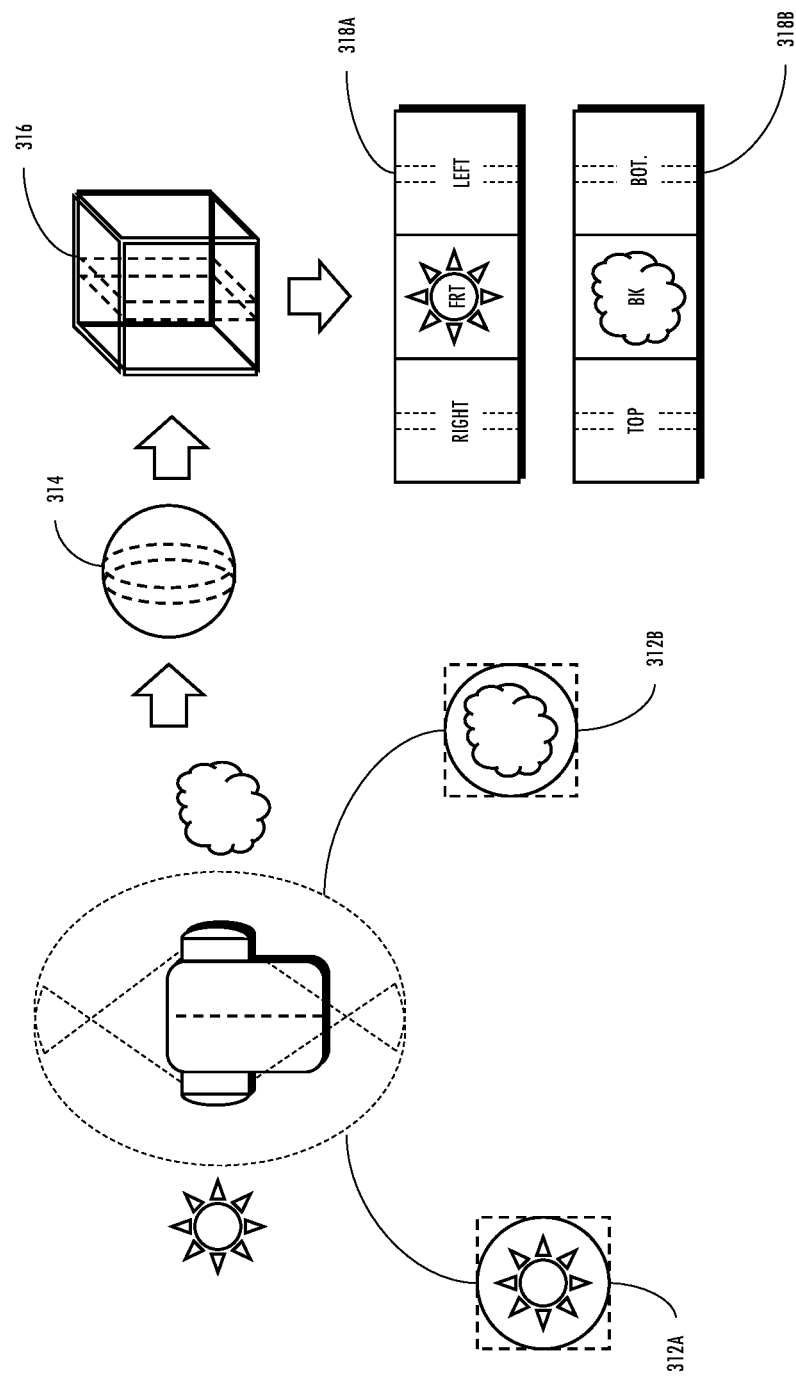

Referring now to FIG. 3B, a graphical illustration of one such exemplary fisheye-to-EAC conversion is depicted. During operation, the first camera 310A captures a first fisheye image 312A and a second camera 310B captures a second fisheye image 312B. In the illustrated embodiment, the fisheye images 312A, 312B are hyper-hemispherical images that overlap (e.g., by 10° degrees). These overlapping regions may be used for the multiband blending and/or image stitching. The fisheye image data 312A, 312B may be roughly stitched "in-camera" into two (2) hemispheres of a spherical projection 314. Artisans of ordinary skill in the related arts will readily appreciate that stitching in-camera uses the overlapping image data between the two (2) original images in order to generate the two (2) hemispheres of the spherical projection 314. Stitching combines the fisheye images to ideally produce an imperceptible (or minimally perceptible) transition between the two (2) hemispheres of the spherical projection 314. Image stitching techniques commonly include e.g., edge detection, motion detection, parallax correction, perspective warping, etc. As shown in FIG. 3B, the overlapping image data is retained for shared multiband blending.

The spherical projection 314 is converted into an EAC projection 316 with retained overlapping image data. The EAC projection may entail warping the fisheye data according to the ideal mathematical relationship between the spherical projection and the EAC projection. Subsequently thereafter, the EAC projection 316 with retained overlapping image data may in one approach be divided into front, back, left, right, top, and bottom portions, wherein each portion represents image data from corresponding fields of view from the two fisheye cameras. For example, the front portion of the spherical projection corresponds to image data from the center of fisheye image 312A. The back portion of the spherical projection corresponds to image data from the center of fisheye image 312B. The top portion of the spherical projection corresponds to image data stitched together from the top parts of the front and back fisheye images 312A/312B. The left, right, and bottom portions of the spherical projection are similarly collected from their corresponding images.

The front, back, left, right, top, and bottom portions of the fisheye image data are mapped onto corresponding front, back, left, right, top, and bottom facets of an EAC projection. In one exemplary embodiment, the EAC projection 316 with retained overlapping image data can be split into a first image segment 318A (corresponding to the right, front, and left facets), and a second image segment 318B (corresponding to the top, back, and bottom facets). Notably, the exemplary partitioning ensures that each facet represents a continuous image (e.g., right and back facets share an edge), which may improve compression and/or reduce compression artifacts caused by image discontinuities.

While the present disclosure is discussed in the context of EAC, any rectangular format may be substituted with equal success. For instance, in one exemplary variant, the multiband algorithm may be applied on an equi-rectangular projection (ERP). Due to the differences in pixel information density of ERP (versus EAC) and the potentially lossy/noisy nature of stitching, ERP projections may further benefit from additional manipulations. As but one such example, an ERP projection can be rotated such that the "stitch line" runs horizontally through the center of the ERP (where the ERP is least distorted). Minimizing image distortions along the stitch line reduces stitching complexity and/or reduces the possibility of introducing undesirable stitching artifacts.

Figure 3C:
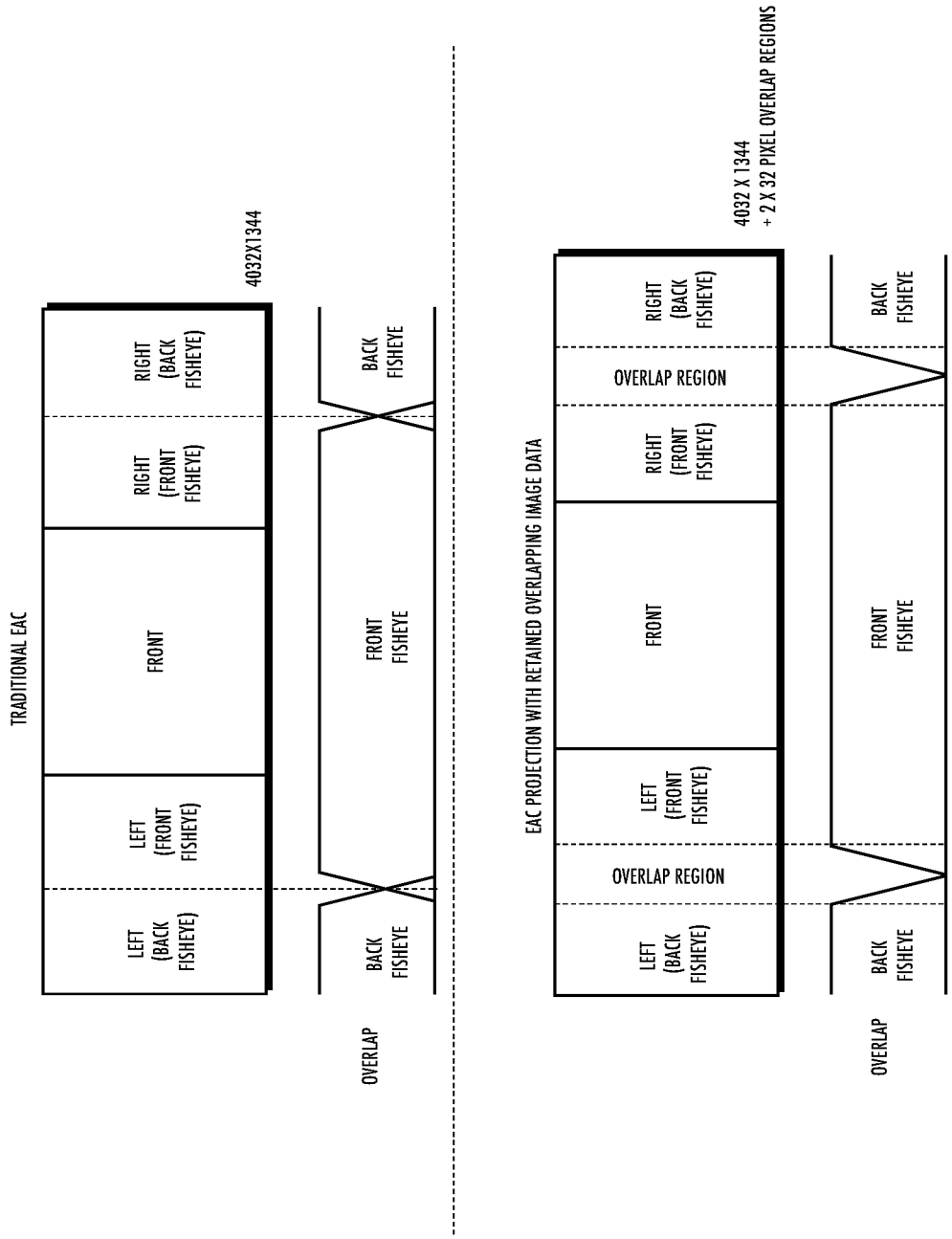

FIG. 3C provides a graphical illustration that illustrates the structural differences between a traditional EAC projection, and the exemplary EAC projection with retained overlapping image data. As shown therein, a traditional EAC data structure uses the image stitching information to blend image data from the front and back fisheyes at the transition point. In contrast, the exemplary EAC projection with retained overlapping image data has been stitched but preserves both sides of the overlapping data.

As a brief aside, encoding and decoding of audio/visual (A/V) media can be handled via either software emulation, or in dedicated hardware circuits. Hardware codecs are composed of physical logic and sequential components; thus, hardware codecs have hard limitations on the amount of data that they can process (e.g., throughput) and the size of data they can handle (e.g., row and/or column buffer sizes). For example, most existing hardware codecs that comply with High Efficiency Video Coding (HEVC) Level 5.1 include hardware components that accept pixel line widths up to (but not exceeding) 4096 pixels (and/or pixel column depths up to 2160 pixels). In contrast, software-based codecs can be useful where the A/V media is of unusual size/frame rate or has non-standardized features. Unfortunately, software-based codec operation logically emulates hardware with arithmetic operations which consumes processing resources and is much slower (e.g., 50×). In the illustrated embodiment of FIG. 3C, an EAC that uses 1344×1344 cube faces can be split into two (2) image segments of 4032×1344 that include 2 overlap bands (of 32 pixels width). The modified EAC data structure fits within the hardware limitations of most HEVC 5.1 commodity codecs (4096×1344).

Figure 4A:
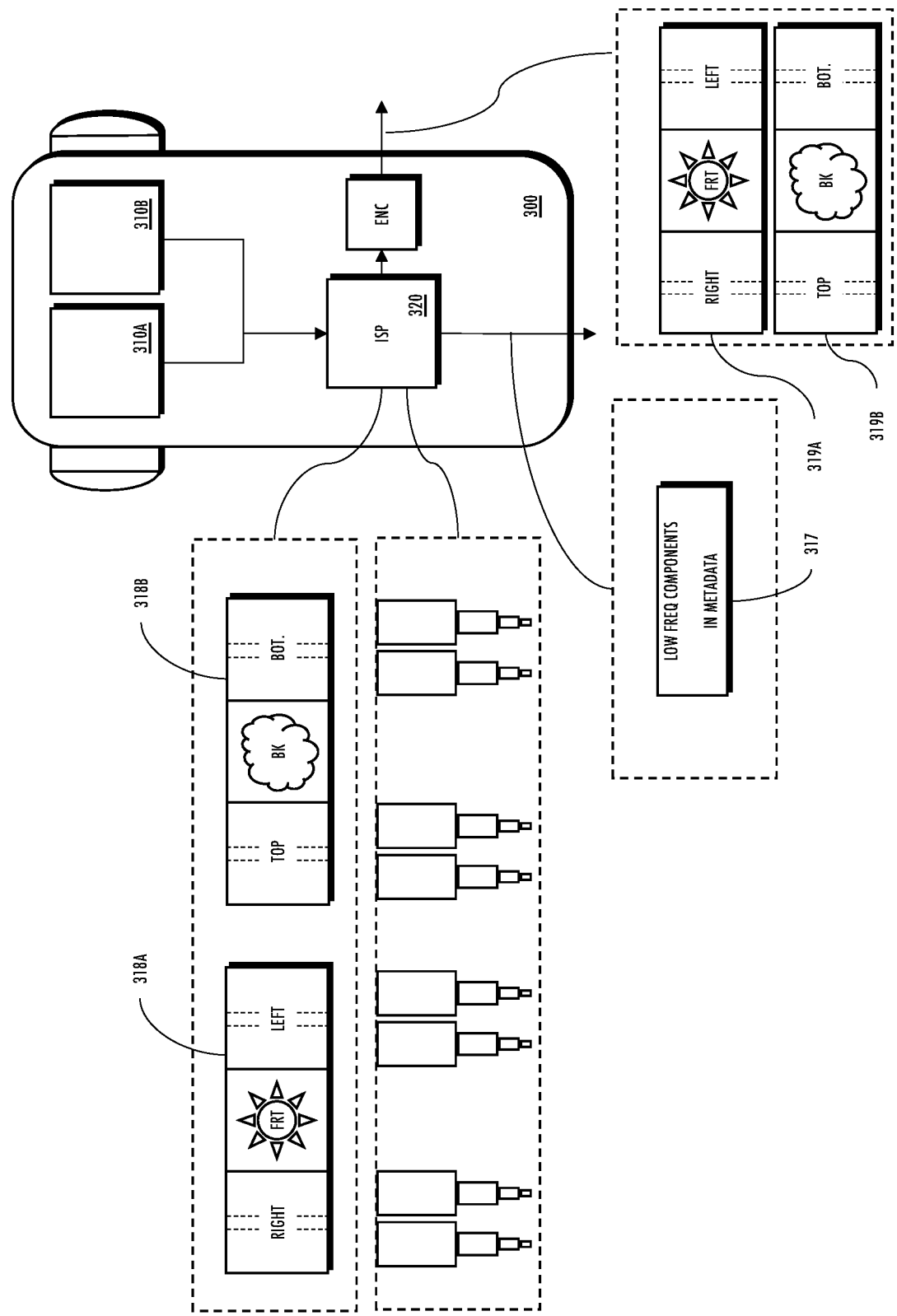
FIGS. 4A-4B are graphical representations of shared image processing among multiple devices, useful to illustrate various aspects of the present disclosure.

Referring now to FIG. 4A, the action camera 300 can use its ISP 320 and any residual processing cycles (i.e., after all real time tasks have been handled) to perform multiband blending at best effort. Notably, the action camera 300 still prioritizes real time tasks over the multiband blending tasks. For example, the action camera may perform the foregoing operation while it is continuously shooting footage. Even though the action camera 300 may not have resources to handle the multiband blend of the entire action camera's footage (e.g., a meridian of 5376×32 pixels), the action camera 300 can do a significant portion. Empirically, multiband blending can provide sufficient image quality (IQ) with blends as low as nine (9) scales (e.g., $2^9+1=513$ pixels). Thus, an action camera that can assist with even three (3) or four (4) scales provides substantial benefit.

In one exemplary implementation, the action camera downscales the bands used for multiband blending, and upscales only a portion of the bands to reduce the upscaling requirement for other mobile devices. More directly, instead of delivering image segments 318A, 318B (the EAC projection with retained overlapping image data), the action camera can provide a partially blended EAC 319A, 319B, and low frequency band information via metadata 317. Notably, the partially blended EAC 319A, 319B still provides overlapping image data, however the exposure transition is partially blended and perceptibly less noticeable. In other words, the overlapping image data of the partially blended EAC 319A, 319B can be cropped out for ready-to-share applications, or the partial multiband blend can be completed with the low frequency portions that are provided in metadata 317.

Figure 4B:
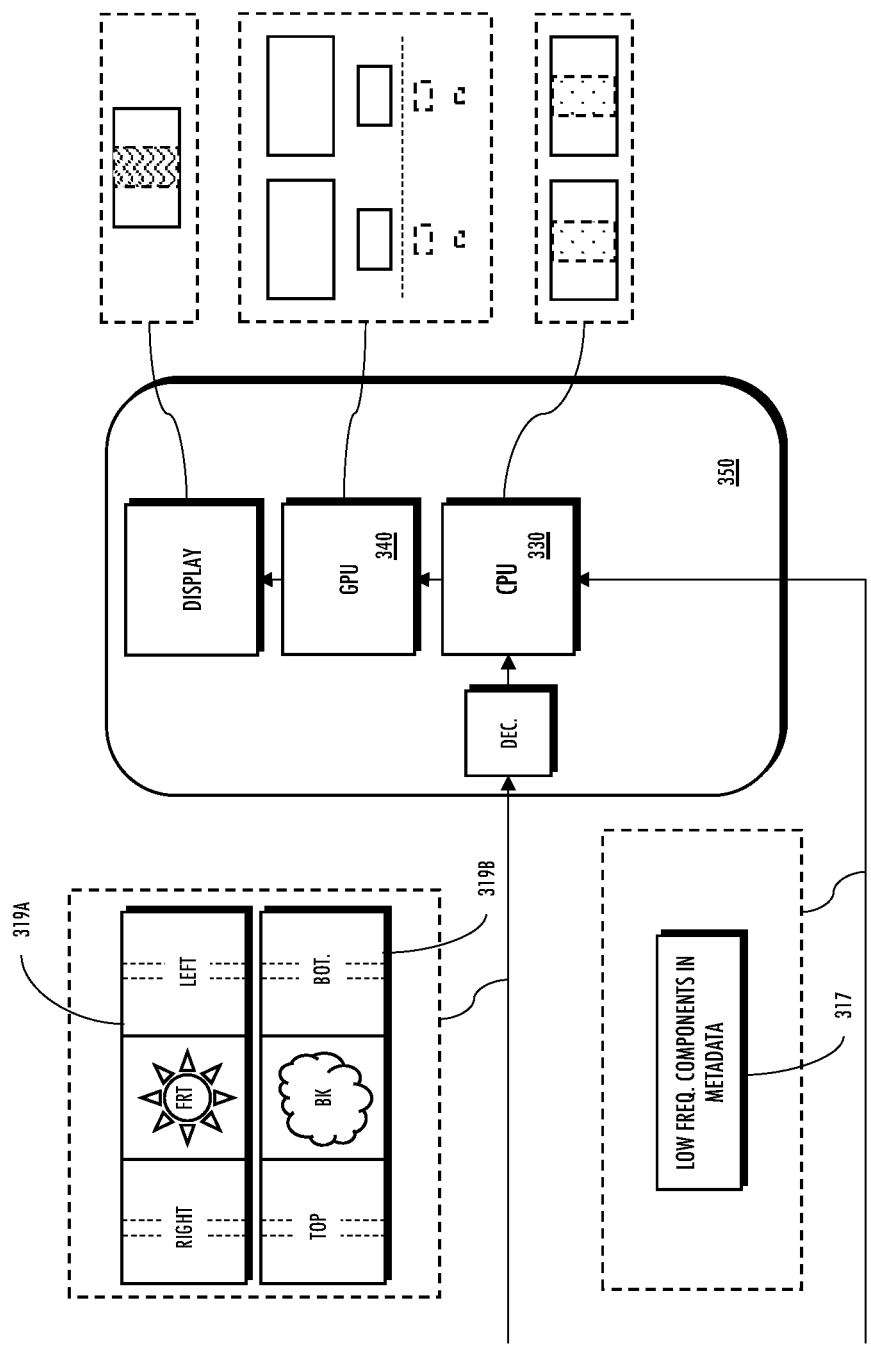

As shown in FIG. 4B, the mobile device 350 (e.g., a smart phone) obtains the partially blended EAC segments 319A, 319B and (if desired) the low frequency components via metadata 317. Depending on mobile device and/or usage considerations, the received content may be directly used, or further processed. For example, the smart phone 350 can directly share the content as-is by cropping out the overlap region. In other cases, the smart phone 350 can finish the remaining scales of the multiband blend using the low frequency components in metadata 317.

As a brief aside, multiband blending is a linear operation; linear functions have the mathematical property of superposition. In other words, splitting a multiband blend into multiple blends can be used to provide identical results compared to a single multiband blend. For example, the following equation describes a single multiband blend:

$$\text{Recompose}_X = \text{Blend}_X(\text{Down}_X(img^F) - Up(\text{Down}_{X+1}(img^F)), \text{Down}_X(img^B) - Up(\text{Down}_{X+1}(img^B))) + Up(\text{Recompose}_{X+1}) \qquad \text{Eqn. 1}$$

Which is mathematically equivalent to:

$$\text{Recompose}_X = \text{Blend}_X(\text{Down}_X(img^F), \text{Down}_X(img^B)) + (Up(\text{Recompose}_{X+1}) - \text{Blend}_X(Up(\text{Down}_{X+1}(img^F)), Up(\text{Down}_{X+1}(img^B)))) \qquad \text{Eqn. 2}$$

where:
  $\text{Down}_X(img)$ is the operation that downsamples the image img, X times;
  $Up(img)$ is the operation that upsamples the image img;
  $\text{Recompose}_X$ is the image obtained for level X after blending and recomposing; and
  $\text{Blend}_X(img^1, img^2)$ is the operation that blends $img^1$ and $img^2$ at level X.

In view of the linear nature of multiband blending, the foregoing system of FIG. 3A may flexibly allocate some or all of the operations to either or both of the action camera 300 and/or the mobile device 350. Each of the foregoing mathematical operations: downscaling, upscaling, recomposing, and/or blending, may be performed in a multitude of different ways. Thus, the following variants can distribute processing burden depending on a variety of considerations (e.g., camera bandwidth, mobile device bandwidth, usage requirements, etc.).

Consider EAC image projections that include overlapping image data for 5.6K spherical content; as previously noted, the segments are each 4096×1344 (4032×1344 with two 32-pixel width overlap bands). Empirically, a multiband blend of 9 scales (513-pixel width) provides sufficient image quality (IQ); thus, two images are cut-out from the front and back camera portions. Specifically, the front image includes: 241 front pixels, 32 overlapping pixels, and 240 unknown pixels. The back image includes: 240 back pixels, 32 overlapping pixels, and 241 unknown pixels. The unknown pixels for each image are assigned a mask value of 0, the respective front and back pixels are assigned a mask value of 1, and the overlapping pixels may be assigned a value ranging between 0 and 1 (e.g., the transition weight).

Let D denote the multiband blend depth that is handled by the camera. For a multiband blend of 513-pixel width, there are 9 scales. Notably however, YUV images have twice as much Y data as UV data (e.g., 513 Y pixels corresponds to 257 UV pixels). Thus, as a practical implementation limitation, to represent a multiband blend of 513-pixel width for a YUV image, only 8 scales are needed. In other words, a multiband blend of depth D=8 would mean that the camera handles the entire 513-pixel width multiband blend.

Initially, each image is downscaled. In some embodiments, the camera performs the entire downscale (e.g., all 8 downscales for a 513-pixel width blend); in other variants, the camera may only downscale to the pixel width required for its blend (e.g., $2^D+1$).

The camera may (in some variants) perform a partial multiband blend at scale D. During this operation, only the three middle lines of level D are blended, the other lines are ignored. Notably, the three middle lines at level D correspond to the overlap pixels for level D. For example, if D is 3, then the front and back images have a pixel width of 65 at scale 3; thus, lines 31, 32, and 33 are blended. In some variants, the lines are linearly blended (e.g., a linear blend of size 3). In other variants, the lines may not be blended (a blend may introduce visual artifacts if there are image discontinuities). Additionally, in some variants, the camera may compute the blend from the uppermost scale (e.g., 8) to the immediate prior scale (e.g., D−1).

After performing the partial multiband blend at scale D, the low frequency components for scale D can be calculated in accordance with the following equation:

$$\text{LowFreq}_D = \text{Recompose}_D - \text{Blend}_D(Up(\text{Down}_{D+1}(img^F)), Up(\text{Down}_{D+1}(img^B))) \qquad \text{Eqn. 3}$$

The result of the foregoing procedure is two partially blended image segments of 513-pixel width and low frequency components. These components may be provided via the aforementioned data structures (partially blended EAC segments 319A, 319B and (if desired) the low frequency components via metadata 317) to another device to consume as-is, or to complete the entire multiband blend.

As previously noted, the superposition properties of multiband blending allow any other device to (if desired) continue the multiband blend, based on the foregoing data structures. Notably, there two types of pixels: (i) pixels that were processed by the camera, and (ii) pixels that were not processed by the camera. With regard to pixels that were processed by the camera, the upsampling operation for subsequent multiband blending are only recursively upsampled (duplicated). The underlying lower frequency information is not affected by upsampling. Additionally, for pixels that were not processed by the camera, their blending weights were only either 1 or 0 (depending on whether they were known or unknown pixels) for each level up through D−1. In other words, the partial multiband blend may be additively improved with higher frequency components, however the underlying lower frequency components will not change in subsequent post-processing.

Consider the following example of a partial multiband blend of 513 pixels for 5.6K video using YUV encoding. Table 1 summarizes each band size for each multiband level (length, width). As shown therein, a 5.6K blend has a length of 5376 and width of 513; notably, the Y-channel is twice the size of the UV-channels and has an extra level.

TABLE 1

| Level | Y-Channel | UV-Channels |
|---|---|---|
| 0 | (5376, 513) | (2688, 257) |
| 1 | (2688, 257) | (1344, 129) |
| 2 | (1344, 129) | (672, 65) |
| 3 | (672, 65) | (336, 33) |
| 4 | (336, 33) | (168, 17) |
| 5 | (168, 17) | (84, 9) |
| 6 | (84, 9) | (42, 5) |
| 7 | (42, 5) | (21, 3) |
| 8 | (21, 3) | — |

Different schemes for allocating memory/processing burden may be used depending on device resources and capabilities. The following discussion presents two illustrative variants: (i) partial in-camera downscaling (no blending) and (ii) in-camera downscaling with some blending. Artisans of ordinary skill in the related arts given the contents of the present disclosure will readily appreciate that the techniques described herein may be broadly extended to virtually any stage and/or iteration of the multiband operation (e.g., downscaling, blending, upscaling, etc.)

Referring now to the first illustrative variant, the camera performs a subset of the downscale for the multiband blend and provides the partial downscaled image to another device for blending and upscaling. For example, Table 2 provides the band sizes for a partial multiband blend of 7 levels performed in-camera (corresponding to a depth D of 6). Note that the multiband blend dimension is "thinner" due to the partial blend, e.g., the multiband blend only spans 129 pixels of Y-Channel at level 0 of the partial blend (compared to 513 pixels of a full blend).

TABLE 2

| Level | Y-Channel | UV-Channels |
|---|---|---|
| 0 | (5376, 129) | (2688, 65) |
| 1 | (2688, 65) | (1344, 33) |
| 2 | (1344, 33) | (672, 17) |
| 3 | (672, 17) | (336, 9) |
| 4 | (336, 9) | (168, 5) |
| 5 | (168, 5) | (84, 3) |
| 6 | (84, 3) | — |

The remaining levels of the multiband blend can be provided in metadata for post-processing. In this example, since the off-camera application can downscale from level D+1 to the final multiband blend (D=8), only the bands corresponding to level D+1 are needed. Notably, even though the chrominance (UV) bands are half the size of the luminance (Y) band, one less level is performed. In other words, each of the bands are equally sized; thus, the metadata includes a Y-channel band (42×5), U-channel band (42×5), and V-channel data (42×5) for both hemispheres, i.e., 1260 pixels of information.

Referring now to the second illustrative variant, the camera performs all of the downscales and some of the blending; the remaining portions are provided to the off-camera application to finish. In other words, the camera may downscale all 8 levels, and additionally start the blending and upscaling. For instance, the camera may blend and compute LowFreq$_D$ (see Eqn. 3, supra) for bands 8, 7, and 6 prior to delivery. Since the upscaled bands incorporate lower band information, either LowFreq$_D$ for Level 6 or the remaining unblended bands may be provided in metadata. Thus, in this example, LowFreq$_D$ could be copied in the metadata (per Table. 1 supra, 84×9=796), or alternatively the bands may be provided as-is (3×(42×5)=630). As a practical matter, metadata is slightly smaller but LowFreq$_D$ calculations are postponed for downstream processing; thus, different implementations shift in-camera and off-camera processing and memory use.

Methods

FIG. 5A is a logical block diagram of one exemplary method 500 for shared image processing among multiple devices, consistent with various principles of the present disclosure.

At step 502 of the method 500, spherical content is obtained by a camera system or an image signal processor on the camera system. In one exemplary embodiment, the images include wide field-of-view (FOV) data captured from two (2) hyper-hemispherical cameras in a Janus orientation. Other implementations may use any number or combination of e.g., cameras (e.g., 0, 1, 3, 4, etc.) sensors (sonar, lidar, radar, infrared), and/or other source data (e.g., computer models).

In some cases, the spherical content may be obtained by a single omnidirectional camera device (e.g., an action camera). In one embodiment, spherical content may be obtained by one or more cameras of a camera system and one or more cameras external to the camera system (e.g., multiple networked camera devices). In yet another embodiment, the spherical content is obtained from cameras completely external to a device (e.g., a smart phone, laptop, or similar media processing device) and the device partially processes the obtained spherical content.

Spherical content, also known as 360° and/or immersive content, includes "still" photos or "moving" videos that span a field of view of 360°. While the discussions presented herein are in the context of spherical image capture, the techniques may be readily applied to non-spherical multiband processing. As but one such example, a device could perform partial multiband blending on traditional aspect photography to e.g., superimpose/blend images for immediate display/review. Subsequent image processing may be used to refine the partial blend. More generally, any media (spherical or otherwise) may be substituted by artisans of ordinary skill in the related art given the contents of the present disclosure. Examples of such media may include e.g., images, video, and/or any captured, rendered, and/or generated data (e.g., virtual or augmented reality data, sonar, lidar, infrared, and/or other electro-magnetic radiation).

At step 504 of the method 500, the spherical content is converted to an overlapping data structure by the camera system. In one exemplary embodiment, the overlapping data structure may be created by aligning regions of the content that "overlap" in preparation for e.g., blending, stitching, and any subsequent post-processing.

In some embodiments, each version of the overlapping region is retained. For example, both a front and a back overlap region may be retained for a Janus-style action camera. As but another example, a multi-camera system (3, 4, 6, etc.) may have multiple versions of the same overlapping region. In some variants, only a subset of the overlapping regions may be retained; for example, a multi-camera system (3, 4, 6, etc.) may only keep two overlap regions to reduce downstream memory and/or processing burden. In some variants, overlap region retention may be configurable based on user and/or application preferences.

Retaining the overlapping regions allows for additional iterations of a blend operation to be performed on another device. In some cases, the other device may have access to more processing resources and may be able to improve image quality (IQ) according to subjective or objective indicia (e.g., human perception, signal-to-noise, etc.). In other embodiments, a subsequent blend may be performed on the same device at a later time (e.g., when the processor has completed all time sensitive tasks and is idle, running background tasks, or has spare bandwidth). This may allow for real-time replay on the camera system, or near real-time streaming to a tethered display device, while retaining data for a more complete blend when processing resources on camera system are available.

Alignment may be performed based on similarities and/or differences in image information between the overlap regions. Alignment techniques may include without limitation: feature matching, edge matching, texture matching, warping, stretching, shrinking, cropping, motion estimation, motion prediction, and/or any other image processing technique. Other alignment techniques may be based on physical world assumptions and/or detected subject distance (e.g., a stitch line may be assumed to be at the 180° meridian and/or warped according to subject distance).

In one exemplary embodiment, the overlapping data structure may be a spherical projection. For example, the spherical content may be projected into an adjusted cubemap projection (ACP), adjusted equal-area projection (AEP), cubemap, equi-angular cubemap (EAC), equal area projection (EAP), equatorial cylindrical projection (ECP), equirectangular projection (ERP), rotated sphere projection (RSP), compact icosahedron projection (CISP), hybrid equiangular projection (HEC), modified cubemap projection (MCP), pyramid format, octahedron projection, rotated sphere projection (RSP), or segmented sphere projection (SSP) projections.

In some embodiments, the overlapping regions may be provided as a separate file from the overlapping data structure. For example, a "traditional" EAC projection may have an associated metadata file that includes overlap region data. Other common implementations may e.g., append overlapped portions at the start/end of the file, as a separate media track, or at the start/end of the frame or group of pictures (GOP), or in an additional metadata file.

In some embodiments, the overlapping regions may be included as part of the overlapping image content. For example, a "non-traditional" EAC projection may include overlap regions adjacent to each other at the stitch line in the projection. In some cases, the overlapping data structure may preserve each version of the overlapping regions from each of the multiple stitched images. In other cases, the overlapping data structure may convert the overlapping regions into a derivative format (e.g., multiband blend components, a warp track, etc.).

At step 506 of the method 500, a first subset of image processing is performed on the overlapping data structure by the camera system. In one exemplary embodiment, this may enable a second device (e.g., a smart phone) to immediately consume the content in near real-time at a reduced quality. In other embodiments, this may save processing time/power or memory at the second device so as to enable the second device to complete the multiband blend (in whole, or part) with limited compute resources and/or at best effort. For example, some smart phones may be able to complete a subset of the multiband blend for a 4K display while remaining in real-time processing budgets. In other cases, some users may be willing to wait for a short processing delay for a full quality 5.6K blend at best effort.

Image processing may include performing a first portion of a blending or stitching operation. In one exemplary embodiment, camera system can perform a partial multiband blend on the spherical content. A complete multiband blend operation includes a sufficient number of completed scales to imperceptibly smooth over exposure transition artifacts. In some cases, the number of scales may be selected based on subjective measurements and/or quantitative limitations (e.g., display capabilities). A partial multiband blend only performs a subset of the scales of the complete multiband blend.

For example, a partial blend of three or four scales (out of nine scales) may be performed on camera system. Notably, the number of scales may differ between downscaling and upscaling. For instance, in some variants, the camera system may perform all of the downscale overlapping bands of the spherical content used for multiband blending, and upscale only a portion of the bands to reduce the upscaling requirement for use on other devices (e.g., a smart phone or workstation). Low frequency portions that remain unblended may be saved as metadata within the overlapping data structure or as a separate stand-alone metadata file.

At step 508 of the method 500, a first processed content may be consumed either at the camera system itself, or at another device (e.g., a smart phone of the mobile device ecosystem). The first processed content may be stored and viewed at reduced quality since the spherical content has been stitched and partially blended. The spherical content may also be transferred to another device (e.g., workstation) along with/including low frequency metadata for further processing and/or direct viewing with no or minimal blending/intermediate image processing for ready-to-share applications. In one embodiment, to view the processed content without further image processing, camera system may crop out or strip the first processed content of overlapping image data.

FIG. 5B is a logical block diagram of another exemplary method 550 for shared image processing among multiple devices, consistent with various principles of the present disclosure.

At step 552 of the method 550, a first processed content is obtained by workstation or smart phone from e.g., a camera or pre-processing device such as the aforementioned camera system. The transfer of the spherical content may be via a network interface, over wired or wireless network, or via a hard medium (e.g., a disk, flash storage). In one embodiment, the transferred contents may be transmitted according to a real-time budget; the real-time budget may provide enough time for the camera system to capture and partially blend spherical content. In some implementations, the transfer may occur only when available bandwidth, memory, or other network parameters (e.g., connectivity or signal strength between camera system and user device) meet or exceed a prescribed criterion (e.g., threshold).

At step 554 of the method 550, a second subset of image processing is performed on the first processed content by workstation or smart phone. The second subset of image processing may continue image processing performed by another device, e.g., the camera system. In some exemplary embodiments, the second subset of image processing includes completing a blending or stitching operation on a second device using partially processed content (and a separate metadata file, if needed).

In an exemplary embodiment, the workstation or smart phone obtains a partially blended image and metadata that includes low frequency components. The workstation or smart phone can finish the remaining scales of the multiband blend using the low frequency components in the metadata. For example, the remaining scales of the multiband blend can be performed by upsampling portions of the partially blended image and linearly mixing the metadata. In another exemplary embodiment, the workstation or smart phone obtains metadata that includes scales of a previously performed multiband blend; the workstation or smartphone may need to generate low frequency components therefrom.

Following the second subset of image processing, additional metadata and redundant content may be removed from the second processed content (and any external metadata files) to save file storage space and bandwidth on transfer.

At step 556 of the method 550, a second processed content can be consumed by workstation or smart phone. The workstation or smart phone may display the spherical content directly (e.g., on an attached display) or transmit the spherical content to another device for viewing or further processing.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C #/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for shared image processing, the method comprising:
    obtaining spherical content;
    converting the spherical content to an overlapping data structure;
    performing, by a first device, a first portion of a multiband blend operation on the overlapping data structure generating a first image processed data structure; and
    transferring the first image processed data structure to a second device.

2. The method for shared image processing of claim 1, wherein the spherical content comprises a plurality of hyper-hemispherical content with at least one overlapping portion between the plurality of hyper-hemispherical content to enable a device to stitch the plurality of hyper-hemispherical content into a representation that approximates an entire sphere.

3. The method for shared image processing of claim 1, wherein the spherical content is obtained from a plurality of cameras.

4. The method for shared image processing of claim 1, wherein:
    the spherical content comprises a plurality of hyper-hemispherical content with at least one overlapping portion between the plurality of hyper-hemispherical content, and
    the overlapping data structure comprises the at least one overlapping portion for each of the plurality of hyper-hemispherical content.

5. The method for shared image processing of claim 1, wherein the overlapping data structure comprises an equi-angular cubemap spherical projection with retained overlap regions adjacent to each other at a stitch line in the equi-angular cubemap spherical projection.

6. The method for shared image processing of claim 1, wherein the first portion of the multiband blend operation enables a device to display the overlapping data structure without performing an additional blending operation.

7. The method for shared image processing of claim 1, wherein the first portion of the multiband blend operation enables a device to perform an additional blending operation on the overlapping data structure.

8. The method for shared image processing of claim 1, wherein the first portion of the multiband blend operation comprises:
    performing fewer scales of the multiband blend operation than a complete multiband blend operation;
    creating low frequency metadata representing low frequency unblended portions of the spherical content; and
    storing the low frequency metadata.

9. The method for shared image processing of claim 1, further comprising enabling the second device to perform a second portion of the multiband blend operation on the first image processed data structure.

10. The method for shared image processing of claim 9, further comprising displaying the first image processed data structure without performing an additional blending operation within a real-time budget.

11. The method of claim 1, where converting the spherical content to the overlapping data structure comprises aligning overlapping regions of the spherical content.

12. An apparatus for shared image processing, comprising:
    a first camera and a second camera;
    a processor; and
    a non-transitory computer-readable medium comprising one or more instructions which, when executed by the processor causes the apparatus to:
        capture spherical content by the first camera and the second camera, the spherical content comprising overlapping regions captured by the first camera and the second camera;
        align the spherical content to create an overlapping data structure;
        perform a partial multiband blend on the overlapping data structure to create a partially processed overlapping data structure with low frequency metadata; and
        transmit the partially processed overlapping data structure with the low frequency metadata to a second device.

13. The apparatus for shared image processing of claim 12, further comprising a display, wherein the one or more instructions, when executed by the processor, further causes the apparatus to:
    crop out portions of overlapping content from the partially processed overlapping data structure to create a cropped partially processed overlapping data structure; and
    display the cropped partially processed overlapping data structure.

14. The apparatus for shared image processing of claim 12, wherein the partial multiband blend is performed within idle periods of a real-time budget for capturing the spherical content by the first camera and the second camera.

15. The apparatus for shared image processing of claim 12, wherein the partial multiband blend comprises performing fewer scales of a multiband blend operation than a complete multiband blend operation.

16. A method for multi-stage image processing, the method comprising:
    receiving a data structure comprising image data of overlapping regions;
    performing a first portion of a multi-band blend on the data structure based on the image data of overlapping regions;
    saving low-frequency portions of the data structure that remain unblended after the first portion of the multi-band blend within the data structure creating a partially blended data structure with low-frequency metadata; and
    transferring, by a first device, the partially blended data structure with low-frequency metadata to a second device configured to complete the multi-band blend.

17. The method of claim 16, where the first portion of the multi-band blend comprises performing a partial multi-band blend of high-frequency portions of the data structure.

18. The method of claim 16, further comprising:
    receiving first image data from a first camera with a first hyper-hemispherical field-of-view lens;
    receiving second image data from a second camera with a second hyper-hemispherical field-of-view lens; and
    stitching the first image data and the second image data to create the data structure, where the data structure comprises an overlap band of image data from the first image data and the second image data, comprising at least a portion of the image data of overlapping regions.

19. The method of claim 16, where the first portion of the multi-band blend comprises:
    performing a number of downscale operations on the data structure; and
    performing a different number of upscale operations on the data structure.

20. The method of claim 16, where:
    the first portion of the multi-band blend on the data structure is performed by the first device at a best effort, and
    a number of scales of the first portion of the multi-band blend to perform is based on remaining resources available on the first device after prioritized tasks are allocated resources on the first device.

* * * * *

UNITED STATES PATENT AND TRADEMARK OFFICE
CERTIFICATE OF CORRECTION

| | | |
|---|---|---|
| PATENT NO. | : 11,734,796 B2 | Page 1 of 1 |
| APPLICATION NO. | : 17/230135 | |
| DATED | : August 22, 2023 | |
| INVENTOR(S) | : Gladys Jocelyne Marc et al. | |

It is certified that error appears in the above-identified patent and that said Letters Patent is hereby corrected as shown below:

In the Specification

Column 4, Lines 25 and 34, delete each occurrence of "1/4" and insert --1/2--.

Column 6, Line 28, cancel the text beginning "A relatively recent phenomenon" and ending "phone, etc.)." in Column 6, Line 38.

Signed and Sealed this
Seventeenth Day of September, 2024

*Katherine Kelly Vidal*

Katherine Kelly Vidal
*Director of the United States Patent and Trademark Office*